(12) United States Patent
Ni

(10) Patent No.: US 9,277,605 B2
(45) Date of Patent: Mar. 1, 2016

(54) SOLID-STATE LIGHTING APPARATUS AND METHODS USING CURRENT DIVERSION CONTROLLED BY LIGHTING DEVICE BIAS STATES

(75) Inventor: Liqin Ni, Raleigh, NC (US)

(73) Assignee: Cree, Inc., Durham, NC (US)

( * ) Notice: Subject to any disclaimer, the term of this patent is extended or adjusted under 35 U.S.C. 154(b) by 210 days.

(21) Appl. No.: 13/235,127

(22) Filed: Sep. 16, 2011

(65) Prior Publication Data

US 2013/0069536 A1  Mar. 21, 2013

(51) Int. Cl.
H05B 37/02  (2006.01)
H05B 33/08  (2006.01)

(52) U.S. Cl.
CPC .......... H05B 33/0809 (2013.01); H05B 33/083 (2013.01); H05B 37/02 (2013.01)

(58) Field of Classification Search
CPC ................................ H05B 37/00; H05B 37/02
USPC .......... 315/185 R, 209 R, 210, 224, 291, 299, 315/307, 308
See application file for complete search history.

(56) References Cited

U.S. PATENT DOCUMENTS

| 4,504,776 | A | 3/1985 | Haville |
| 5,059,890 | A | 10/1991 | Yoshikawa et al. |
| 5,504,448 | A | 4/1996 | Bennett et al. |
| 5,803,579 | A | 9/1998 | Turnbull et al. |
| 5,941,626 | A | 8/1999 | Yamuro |
| 6,137,235 | A | 10/2000 | Franck |
| 6,556,067 | B2 | 4/2003 | Henry |
| 7,088,059 | B2 | 8/2006 | McKinney et al. |
| 7,271,545 | B2 | 9/2007 | Hu et al. |
| 7,291,983 | B2 | 11/2007 | Hu et al. |
| 7,649,326 | B2 | 1/2010 | Johnson et al. |

(Continued)

FOREIGN PATENT DOCUMENTS

| CN | 1943276 | 4/2007 |
| CN | 101137261 A | 3/2008 |

(Continued)

OTHER PUBLICATIONS

International Search Report Corresponding to International Application No. PCT/US2012/047344; Date of Mailing: Dec. 3, 2012; 16 Pages.

(Continued)

Primary Examiner — Tung X Le
(74) Attorney, Agent, or Firm — Myers Bigel & Sibley, P.A.

(57) ABSTRACT

A lighting apparatus includes a string of light emitting diode (LED) sets coupled in series, each set including at least one LED. The apparatus further includes a plurality of current diversion circuits, respective ones of which are coupled to respective nodes of the string and configured to operate responsive to bias state transitions of respective ones of the LED sets. In some embodiments, a first one of the current diversion circuits is configured to conduct current via a first one of the LED sets and is configured to be turned off responsive to current through a second one of the LED sets. The first one of the current diversion circuits may be configured to conduct current responsive to a forward biasing of the first one of the LED sets and the second one of the current diversion circuit may be configured to conduct current responsive to a forward biasing of a second one of the LED sets.

27 Claims, 10 Drawing Sheets

(56) References Cited

U.S. PATENT DOCUMENTS

| | | | |
|---|---|---|---|
| 7,688,002 B2* | 3/2010 | Ashdown et al. | 315/291 |
| 7,781,979 B2 | 8/2010 | Lys | |
| 7,804,256 B2 | 9/2010 | Melanson | |
| 7,994,725 B2 | 8/2011 | Bouchard | |
| 8,174,201 B2 | 5/2012 | Lee | |
| 8,207,685 B2* | 6/2012 | Cheng | H05B 33/0824 |
| | | | 315/185 R |
| 8,242,704 B2 | 8/2012 | Lethellier | |
| 8,508,140 B2* | 8/2013 | Leung et al. | 315/192 |
| 8,519,630 B2 | 8/2013 | Wang et al. | |
| 8,791,641 B2 | 7/2014 | van de Ven et al. | |
| 8,970,131 B2 | 3/2015 | Brandes et al. | |
| 2002/0097095 A1 | 7/2002 | Jeon et al. | |
| 2004/0036418 A1 | 2/2004 | Rooke et al. | |
| 2004/0046510 A1 | 3/2004 | Allen | |
| 2004/0189218 A1 | 9/2004 | Leong et al. | |
| 2004/0208009 A1 | 10/2004 | Mardon et al. | |
| 2005/0057179 A1 | 3/2005 | Madhani et al. | |
| 2005/0140282 A1 | 6/2005 | Park et al. | |
| 2006/0261754 A1 | 11/2006 | Lee | |
| 2007/0013647 A1 | 1/2007 | Lee et al. | |
| 2007/0096661 A1 | 5/2007 | Allen | |
| 2007/0108843 A1 | 5/2007 | Preston et al. | |
| 2007/0257623 A1 | 11/2007 | Johnson et al. | |
| 2007/0273299 A1 | 11/2007 | Miskin et al. | |
| 2008/0048567 A1* | 2/2008 | Steele et al. | 315/151 |
| 2008/0094000 A1 | 4/2008 | Yamamoto et al. | |
| 2008/0122376 A1 | 5/2008 | Lys | |
| 2009/0170226 A1 | 7/2009 | Wall, Jr. | |
| 2009/0184662 A1 | 7/2009 | Given et al. | |
| 2009/0195168 A1 | 8/2009 | Greenfeld | |
| 2009/0284172 A1* | 11/2009 | Maschietto et al. | 315/294 |
| 2010/0060175 A1 | 3/2010 | Lethellier | |
| 2010/0072902 A1 | 3/2010 | Wendt et al. | |
| 2010/0109537 A1 | 5/2010 | Nishino et al. | |
| 2010/0109557 A1 | 5/2010 | Bouchard | |
| 2010/0109570 A1 | 5/2010 | Weaver | |
| 2010/0156763 A1 | 6/2010 | Lee et al. | |
| 2010/0194274 A1 | 8/2010 | Hoogzaad | |
| 2010/0207150 A1 | 8/2010 | Grajcar | |
| 2010/0231135 A1 | 9/2010 | Hum et al. | |
| 2010/0246197 A1 | 9/2010 | Takahashi et al. | |
| 2010/0264832 A1 | 10/2010 | Archenhold et al. | |
| 2010/0308738 A1 | 12/2010 | Shteynberg et al. | |
| 2010/0308739 A1 | 12/2010 | Shteynberg et al. | |
| 2010/0315016 A1 | 12/2010 | Hoogzaad | |
| 2010/0327746 A1 | 12/2010 | Hisayasu | |
| 2011/0025217 A1 | 2/2011 | Zhan et al. | |
| 2011/0101883 A1 | 5/2011 | Grajcar | |
| 2011/0109228 A1 | 5/2011 | Shimomura et al. | |
| 2011/0109244 A1 | 5/2011 | Grajcar | |
| 2011/0169417 A1 | 7/2011 | Hum et al. | |
| 2011/0180818 A1 | 7/2011 | Lerman et al. | |
| 2011/0181194 A1 | 7/2011 | Hum et al. | |
| 2011/0193467 A1 | 8/2011 | Grajcar | |
| 2011/0199003 A1* | 8/2011 | Muguruma et al. | 315/122 |
| 2011/0210678 A1 | 9/2011 | Grajcar | |
| 2011/0273102 A1 | 11/2011 | van de Ven et al. | |
| 2012/0091920 A1 | 4/2012 | Yang | |
| 2012/0099321 A1 | 4/2012 | Scott et al. | |
| 2012/0176826 A1 | 7/2012 | Lazar | |
| 2012/0194073 A1 | 8/2012 | Wang et al. | |
| 2013/0278157 A1 | 10/2013 | Radermacher | |

FOREIGN PATENT DOCUMENTS

| | | |
|---|---|---|
| CN | 101227780 A | 7/2008 |
| CN | 202529983 | 9/2009 |
| CN | 101668373 A | 3/2010 |
| CN | 101772245 A | 7/2010 |
| CN | 101779522 | 7/2010 |
| CN | 101827481 A | 9/2010 |
| CN | 101994932 A | 3/2011 |
| CN | 201758472 A | 3/2011 |
| CN | 102804926 A | 11/2012 |
| TW | I294256 | 3/2008 |
| WO | WO 2008/129504 | 10/2008 |

OTHER PUBLICATIONS

International Search Report Corresponding to International Application No. PCT/US2012/054384; Date of Mailing: Nov. 26, 2012; 13 Pages.

International Search Report Corresponding to International Application No. PCT/US12/54869; Date of Mailing: Nov. 23, 2012; 10 Pages.

International Search Report Corresponding to International Application No. PCT/US12/54888; Date of Mailing: Nov. 23, 2012; 12 Pages.

Japanese Office Action Corresponding to Japanese Patent Application No. 2012-530920; Mailing Date: Jun. 12, 2013; Foreign Text, 3 Pages.

International Search Report Corresponding to PCT/US12/47643; Date of Mailing: Oct. 25, 2012; 10 Pages.

International Preliminary Report on Patentability Corresponding to International Application No. PCT/US2012/054384; Date of Mailing: Mar. 27, 2014; 11 Pages.

International Preliminary Report on Patentability Corresponding to International Application No. PCT/US2012/054869; Date of Mailing: Mar. 27, 2014; 8 Pages.

International Preliminary Report on Patentability Corresponding to International Application No. PCT/US2012/054888; Date of Mailing: Mar. 27, 2014; 10 Pages.

Chinese Office Action Corresponding to Chinese Patent Application No. 201280044038.8; Date of Notification: Dec. 12, 2014; Foreign Text, 16 Pages, English Translation Thereof, 7 Pages.

Chinese Office Action Corresponding to Chinese Patent Application No. 201280052473.5; Date of Notification: Jan. 4, 2015; 14 pages.

European Search Report, EP Application No. 12832595.8; mailed Oct. 7, 2015, 6 pages.

Taiwanese Search Report, TW Application No. 101131404, mailed Oct. 19, 2015, 1 page.

Chinese Office Action and Search Report, CN Application No. 201280044036.9, mailed Dec. 3, 2015, 22 pageS.

* cited by examiner

SOLID-STATE LIGHTING APPARATUS AND METHODS USING CURRENT DIVERSION CONTROLLED BY LIGHTING DEVICE BIAS STATES

FIELD

The present inventive subject matter relates to lighting apparatus and methods and, more particularly, to solid-state lighting apparatus and methods.

BACKGROUND

Solid-state lighting arrays are used for a number of lighting applications. For example, solid-state lighting panels including arrays of solid-state light emitting devices have been used as direct illumination sources, for example, in architectural and/or accent lighting. A solid-state light emitting device may include, for example, a packaged light emitting device including one or more light emitting diodes (LEDs), which may include inorganic LEDs, which may include semiconductor layers forming p-n junctions and/or organic LEDs (OLEDs), which may include organic light emission layers.

Solid-state lighting arrays are used for a number of lighting applications. For example, solid-state lighting panels including arrays of solid-state light emitting devices have been used as direct illumination sources, for example, in architectural and/or accent lighting. Solid-state lighting devices are also used in lighting fixtures, such as incandescent bulb replacement applications, task lighting, recessed light fixtures and the like. For example, Cree, Inc, produces a variety of recessed downlights, such as the LR-6 and CR-6, which use LEDs for illumination. Solid-state lighting panels are also commonly used as backlights for small liquid crystal display (LCD) screens, such as LCD display screens used in portable electronic devices, and for larger displays, such as LCD television displays.

A solid-state light emitting device may include, for example, a packaged light emitting device including one or more light emitting diodes (LEDs). Inorganic LEDs typically include semiconductor layers forming p-n junctions. Organic LEDs (OLEDs), which include organic light emission layers, are another type of solid-state light emitting device. Typically, a solid-state light emitting device generates light through the recombination of electronic carriers, i.e. electrons and holes, in a light emitting layer or region.

Some attempts at providing solid-state lighting sources have involved driving an LED or string or group of LEDs using a rectified AC waveform. However, because the LEDs require a minimum forward voltage to turn on, the LEDs may turn on for only a part of the rectified AC waveform, which may result in visible flickering, may undesirably lower the power factor of the system, and/or may increase resistive loss in the system. Examples of techniques for driving LEDs with a rectified AC waveform are described in U.S. Patent Application Publication No. 2010/0308738 and in copending U.S. patent application Ser. No. 12/777,842, the latter of which is commonly assigned to the assignee of the present application.

Other attempts at providing AC-driven solid-state lighting sources have involved placing LEDs in an anti-parallel configuration, so that half of the LEDs are driven on each half-cycle of an AC waveform. However, this approach requires twice as many LEDs to produce the same luminous flux as using a rectified AC signal.

SUMMARY

Some embodiments provide a lighting apparatus including a string of light emitting diode (LED) sets coupled in series, each set including at least one LED. The apparatus further includes a plurality of current diversion circuits, respective ones of which are coupled to respective nodes of the string and configured to operate responsive to bias state transitions of respective ones of the LED sets. In some embodiments, a first one of the current diversion circuits is configured to conduct current via a first one of the LED sets and is configured to be turned off responsive to current through a second one of the LED sets. The first one of the current diversion circuits may be configured to conduct current responsive to a forward biasing of the first one of the LED sets and the second one of the current diversion circuit may be configured to conduct current responsive to a forward biasing of the second one of the LED sets.

In some embodiments, the first one of the current diversion circuits is configured to turn off responsive to a voltage at a node of the string. For example, the apparatus may further include a resistor coupled in series with the string and the first one of the current diversion circuits may be configured to turn off responsive to a voltage at a terminal of the resistor. In some embodiments, for example, the first one of the current diversion circuits may include a bipolar transistor providing a controllable current path between a node of the string and a terminal of a power supply, and current through the resistor may vary an emitter bias of the bipolar transistor.

In some embodiments, each of the current diversion circuits may include a transistor providing a controllable current path between a node of the string and a terminal of a power supply and a turn-off circuit coupled to a node of the string and to a control terminal of the transistor and configured to control the current path responsive to a control input. A current through one of the LED sets may provide the control input. The transistor may include a bipolar transistor and the turn-off circuit may be configured to vary a base current of the bipolar transistor responsive to the control input.

In some embodiments of the inventive subject matter, a lighting apparatus includes a rectifier circuit configured to be coupled to an AC power source and to generate a rectified AC voltage and a string of serially-connected LED sets, each set including at least one LED. The apparatus further includes a plurality of current diversion circuits coupled to respective nodes of the string and configured to be selectively enabled and disabled responsive to bias state transitions of the LED sets as a magnitude of the rectified AC voltage varies. A first one of the current diversion circuits may be configured to conduct current via a first one of the LED sets and may be configured to be turned off responsive to current through a second one of the LED sets. The first one of the current diversion circuits may be configured to conduct current responsive to a forward biasing of the first one of the LED sets and the second one of the current diversion circuit may be configured to conduct current responsive to a forward biasing of the second one of the LED sets.

In some embodiments, the first one of the current diversion circuits may be configured to turn off responsive to a voltage at a node of the string. For example, the apparatus may further include a resistor coupled in series with the string and the first one of the current diversion circuits may be configured to turn off responsive to a voltage at a terminal of the resistor.

In some embodiments, the apparatus may further include a resistor coupled in series with the string and each of the current diversion circuits may include a bipolar transistor providing a controllable current path between a node of the string and a terminal of the rectifier circuit. Current through the resistor may vary an emitter bias of the bipolar transistor. In further embodiments, each of the current diversion circuits may include a transistor providing a controllable current path between a node of the string and a terminal of the rectifier circuit and a turn-off circuit coupled to a node of the string and to a control terminal of the transistor and configured to control the current path responsive to a control input. A current through one of the LED sets may provide the control input. The transistor may include a bipolar transistor and the turn-off circuit may be configured to vary a base current of the bipolar transistor responsive to the control input.

In further embodiments, a lighting apparatus includes a string of serially-connected LED sets coupled to a first terminal of a power supply, each LED set including at least one LED. The apparatus also includes a plurality of transistors, respective ones of which are configured to provide respective controllable current paths between respective nodes of the string and a second terminal of the power supply. The apparatus further includes a control circuit configured to control the transistors responsive to bias state transitions of the LED sets.

In some embodiments, a first one of the transistors may be configured to conduct current via a first one of the LED sets and the control circuit may be configured to turn off the first one of the transistors responsive to current through a second one of the LED sets. In some embodiments, the apparatus may further include a resistor coupled in series with the string and an emitter of the first one of the transistors may be biased by a voltage at a terminal of the resistor. In further embodiments, the control circuit may include a turn-off circuit coupled to a node of the string and to a control terminal of the first one of the transistors and configured to turn off the first one of the transistors responsive to a control input. The current through the second one of the LED sets may provide the control input.

Additional embodiments provide an apparatus including a plurality of current diversion circuits, respective ones of which are configured to be coupled to respective nodes of a string of serially-connected LED sets and to operate responsive to bias state transitions of respective ones of the LED sets. A first one of the current diversion circuits may be configured to conduct current via a first one of the LED sets and may be configured to be turned off responsive to current through a second one of the LED sets. The first one of the current diversion circuits may be configured to conduct current responsive to a forward biasing of the first one of the LED sets and the second one of the current diversion circuit may be configured to conduct current responsive to a forward biasing of the second one of the LED sets.

In some embodiments, the first one of the current diversion circuits may be configured to turn off responsive to a voltage at a terminal of a resistor coupled in series with the string. In further embodiments, each of the current diversion circuits may include a transistor configured to provide a controllable current path between a node of the string and a terminal of a power supply and a turn-off circuit configured to be coupled to a node of the string and to a control terminal of the transistor and configured to control the current path responsive to a control input. A current through one of the LED sets may provide the control input. In some embodiments, the apparatus may further include a rectifier circuit configured to be coupled to a power source and having an output configured to be coupled to the string of LED sets.

BRIEF DESCRIPTION OF THE DRAWINGS

The accompanying drawings, which are included to provide a further understanding of the inventive subject matter and are incorporated in and constitute a part of this application, illustrate certain embodiment(s) of the inventive subject matter. In the drawings.

DETAILED DESCRIPTION

Figure 1:
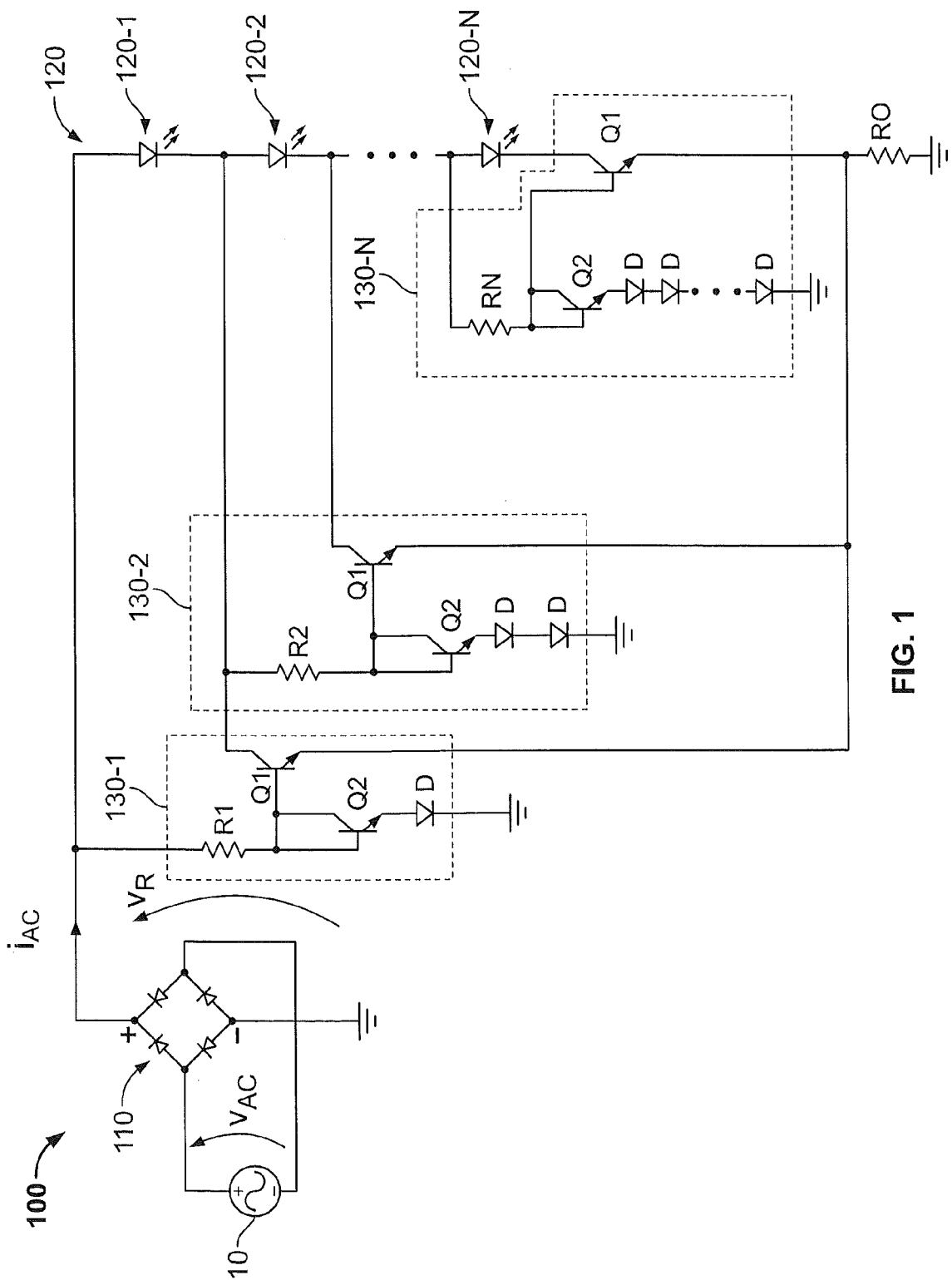
FIG. 1 illustrates a lighting apparatus according to some embodiments.

Embodiments of the present inventive subject matter now will be described more fully hereinafter with reference to the accompanying drawings, in which embodiments of the inventive subject matter are shown. This inventive subject matter may, however, be embodied in many different forms and should not be construed as limited to the embodiments set forth herein. Rather, these embodiments are provided so that this disclosure will be thorough and complete, and will fully convey the scope of the inventive subject matter to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present inventive subject matter. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

It will be understood that when an element or layer is referred to as being "on" another element or layer, the element or layer can be directly on another element or layer or intervening elements or layers may also be present. In contrast, when an element is referred to as being "directly on" another element or layer, there are no intervening elements or layers present. As used herein, the term "and/or" includes any and all combinations of one or more of the associated listed items.

Spatially relative terms, such as "below", "beneath", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation, in addition to the orientation depicted in the figures. Throughout the specification, like reference numerals in the drawings denote like elements.

Embodiments of the inventive subject matter are described herein with reference to plan and perspective illustrations that are schematic illustrations of idealized embodiments of the inventive subject matter. As such, variations from the shapes of the illustrations as a result, for example, of manufacturing techniques and/or tolerances, are to be expected. Thus, the inventive subject matter should not be construed as limited to the particular shapes of objects illustrated herein, but should include deviations in shapes that result, for example, from manufacturing. Thus, the objects illustrated in the figures are schematic in nature and their shapes are not intended to illustrate the actual shape of a region of a device and are not intended to limit the scope of the inventive subject matter.

The terminology used herein is for the purpose of describing particular embodiments only and is not intended to be limiting of the present inventive subject matter. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present inventive subject matter belongs. It will be further understood that terms used herein should be interpreted as having a meaning that is consistent with their meaning in the context of this specification and the relevant art and will not be interpreted in an idealized or overly formal sense unless expressly so defined herein. The term "plurality" is used herein to refer to two or more of the referenced item.

The expression "lighting apparatus", as used herein, is not limited, except that it indicates that the device is capable of emitting light. That is, a lighting apparatus can be a device which illuminates an area or volume, e.g., a structure, a swimming pool or spa, a room, a warehouse, an indicator, a road, a parking lot, a vehicle, signage, e.g., road signs, a billboard, a ship, a toy, a mirror, a vessel, an electronic device, a boat, an aircraft, a stadium, a computer, a remote audio device, a remote video device, a cell phone, a tree, a window, an LCD display, a cave, a tunnel, a yard, a lamppost, or a device or array of devices that illuminate an enclosure, or a device that is used for edge or back-lighting (e.g., back light poster, signage, LCD displays), bulb replacements (e.g., for replacing AC incandescent lights, low voltage lights, fluorescent lights, etc.), lights used for outdoor lighting, lights used for security lighting, lights used for exterior residential lighting (wall mounts, post/column mounts), ceiling fixtures/wall sconces, under cabinet lighting, lamps (floor and/or table and/or desk), landscape lighting, track lighting, task lighting, specialty lighting, ceiling fan lighting, archival/art display lighting, high vibration/impact lighting, work lights, etc., mirrors/vanity lighting, or any other light emitting device.

The present inventive subject matter further relates to an illuminated enclosure (the volume of which can be illuminated uniformly or non-uniformly), comprising an enclosed space and at least one lighting apparatus according to the present inventive subject matter, wherein the lighting apparatus illuminates at least a portion of the enclosed space (uniformly or non-uniformly).

According to some embodiments of the inventive subject matter, a string of solid state lighting device sets, e.g., sets of LEDs, may be incrementally activated and deactivated responsive to a bias states of the device sets. In some embodiments, for example, a plurality of current diversion circuits may be activated and deactivated responsive to the forward biasing of LED sets in a string as a rectified power supply voltage is applied to the string. The current diversion circuits may include, for example, respective transistors that are configured to provide respective controllable current diversion paths. These transistors may be turned on and off by bias transitions of the LED sets, which may be used to effect biasing of the transistors. Such circuitry may be relatively simple in comparison to circuitry that uses comparators or the like to control activation of LED sets in a string.

FIG. 1 illustrates a lighting apparatus 100 according to some embodiments. The apparatus 100 includes a string 120 of serially connected LED sets 120-1, 120-2, . . . , 120-N. Each of the LED sets 120-1, 120-2, . . . , 120-N includes at least one LED. For example, individual ones of the sets may comprise a single LED and/or individual sets may include multiple LEDs connected in various parallel and/or serial arrangements. Power is provided to the LED string 120 from a rectifier circuit 110 that is configured to be coupled to an AC power source 10 and to produce a rectified voltage $v_R$ and current $i_R$ therefrom. The rectifier circuit 110 may be included in the lighting apparatus 100 or may be part of a separate unit coupled to the apparatus 100.

The apparatus 100 further includes respective current diversion circuits 130-1, 130-2, . . . , 130-N connected to respective nodes of the string 120. The current diversion circuits 130-1, 130-2, . . . , 130-N are configured to provide current paths that, in the illustrated embodiments, bypass respective groups of the LED sets 120-1, 120-2, . . . , 120-N. The current diversion circuits 130-1, 130-2, . . . , 130-N each include a transistor Q1 that is configured to provide a controlled current path that may be used to selectively bypass the LED sets 120-1, 120-2, . . . , 120-N. The transistors Q1 are biased using transistors Q2, resistors R1, R2, . . . , RN and diodes D. The transistors Q2 are configured to operate as diodes, with their base and collector terminals connected to one another. Differing numbers of diodes D are connected in series with the transistors Q2 in respective ones of the current diversion circuits 130-1, 130-2, . . . , 130-N, such that the base terminals of current path transistors Q1 in the respective current diversion circuits 130-1, 130-2, . . . , 130-N are biased at different voltage levels. Resistors R1, R2, . . . , RN serve to limit base currents for the current path transistors Q1. The current path transistors Q1 of the respective current diversion circuits 130-1, 130-2, . . . , 130-N will turn off at different emitter bias voltages, which are determined by a current flowing through a resistor R0. Accordingly, the current diversion circuits 130-1, 130-2, . . . , 130-N are configured to operate in response to bias state transitions of the LED sets 120-1, 120-2, . . . , 120-N as the rectified voltage $v_R$ increases and decreases such that the LED sets 120-1, 120-2, . . . , 120-N are incrementally activated and deactivated as the rectified voltage $v_R$ rises and falls. The current path transistors Q1 are turned on and off as bias states of the LED sets 120-1, 120-2, . . . , 120-N change.

Figure 2:
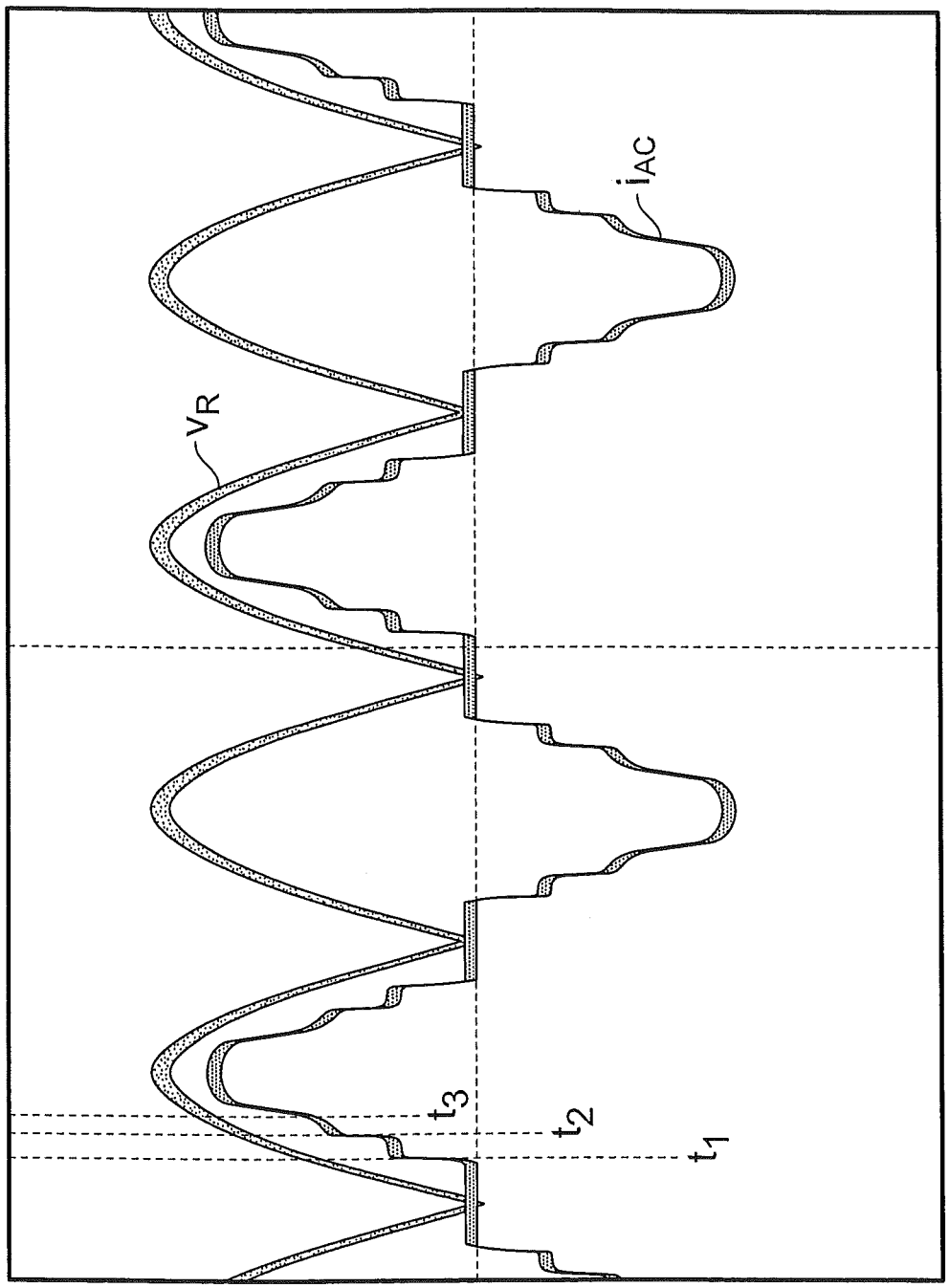
FIG. 2 illustrates current and voltage waveforms for the lighting apparatus of FIG. 1.

FIG. 2 illustrates current and voltage waveforms for an implementation using three LED sets (N=3) using the structure of the apparatus 100 of FIG. 1. Referring to FIG. 1 in conjunction with FIG. 2, when the rectified voltage $v_R$ increases to a level sufficient to forward bias the first LED set 120-1, the transistor Q1 turns on and the current begins to flow through the first LED set 120-1 at around a time t1, causing it to begin emitting light. Current passes through the first LED set 120-1, through the first current diversion circuit 130-1 and through the resistor R0, bypassing the other LED sets in the string 120.

As the rectified voltage $v_R$ continues to increase to a level sufficient to forward bias the second LED set 120-2, the transistor Q1 of the second current diversion circuit 130-2 turns on at around a time t2, allowing current to flow through the first and second LED sets 120-1, 120-2. The resulting increase in current flow through the resistor R0 results in an increase in a voltage across the resistor R0 that causes the base-emitter junction of the current path transistor Q1 of the first current diversion circuit 130-1 to become reversed bias, thus interrupting flow through the first current diversion circuit 130-1. As a result, the bulk of the current flowing through the first and second LED sets 120-1, 120-2 begins to pass through the second current diversion circuit 120-2. As the rectified voltage $v_R$ further increases, a similar transition occurs such that a third current diversion circuit 130-N (N=3) turns on, thus activating the third LED set 120-N at around a time t3, and turning off the second current diversion circuit 130-2. After the rectified voltage $v_R$ peaks and begins to decrease, a reverse series of transitions occurs, such that the third LED set 120-N, the second LED set 120-2 and the first LED set 120-1 are sequentially deactivated. As can be seen in FIG. 2, this results in a rectified current $i_R$ that approximately tracks the rectified voltage $v_R$ in a step-wise manner.

Circuitry along the lines illustrated in FIG. 1 can provide several potential advantages. For example, operating the current diversion circuits 130-1, 130-2, . . . , 130-N responsive to biasing of the LED sets 120-1, 120-2, . . . , 120-N can eliminate the need to use relatively complex comparator circuits that monitor current and/or voltage through the LED string 120 to control bypassing of the LED sets. Relatively simple and inexpensive components may be used for the current diversion circuits 130-1, 130-2, . . . , 130-N, and these components may be relatively easily integrated with the LEDs. For example, the current diversion circuitry (and, optionally, the rectifier circuitry) may be integrated with the LEDs on a common substrate or in an integrated lighting module.

Figure 3:
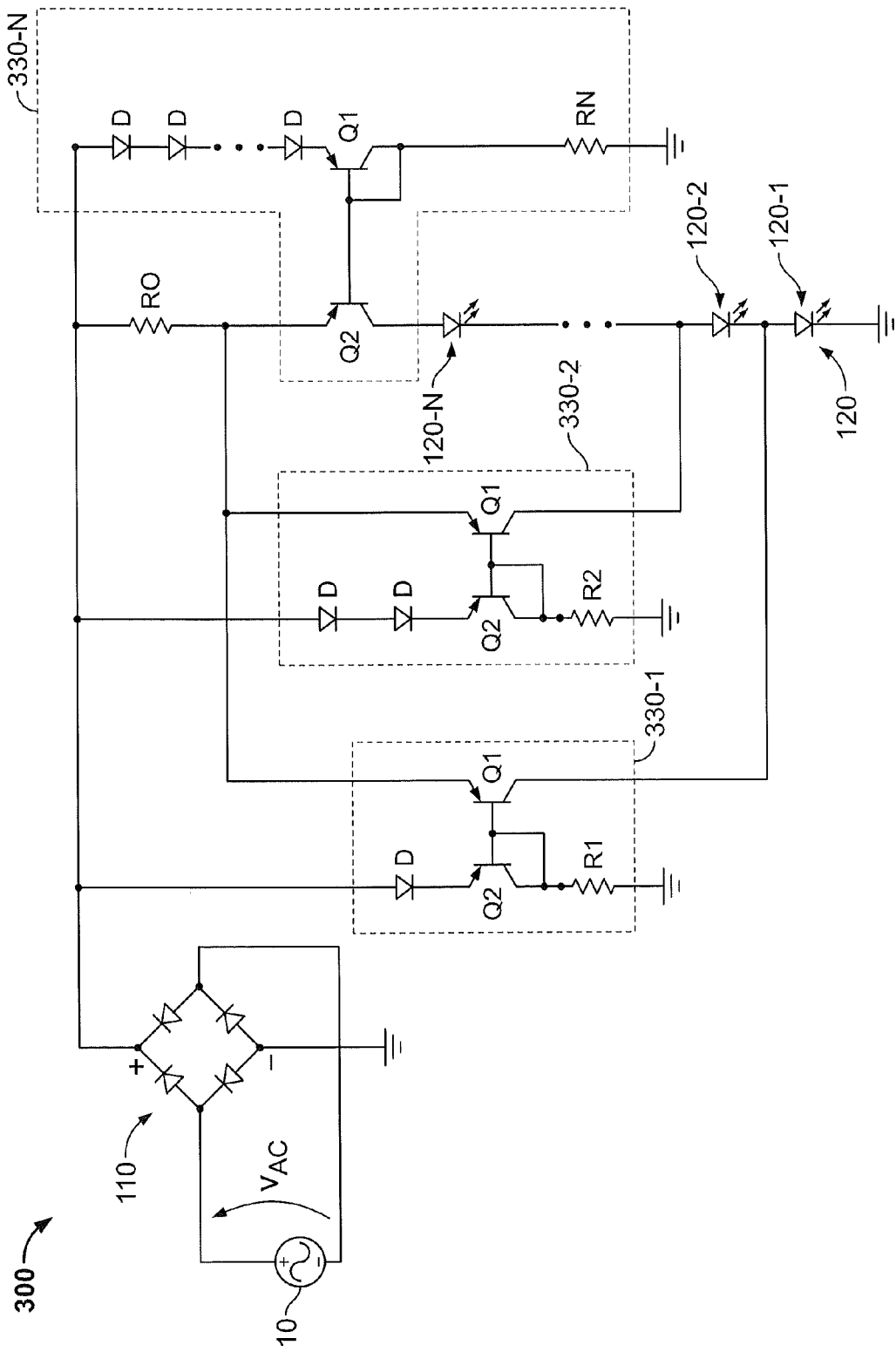
FIGS. 3-5 illustrate lighting apparatus according to various embodiments.

FIG. 3 illustrates a lighting apparatus 300 according to further embodiments, which includes current diversion circuitry that may be viewed as a dual of that illustrated in FIG. 1, using PNP transistors instead of NPN transistors. The apparatus 300 includes a string 120 of LED sets 120-1, 120-2, . . . , 120-N and set of current diversion circuits 330-1, 330-2, . . . , 330-N coupled to nodes of the string 120. The current diversion circuits 330-1, 330-2, . . . , 330-N include PNP current path transistors Q1, which are biased using transistors Q2, resistors R1, R2, . . . , RN, and diodes D. Similar to the apparatus of FIG. 1, as a rectified voltage produced by a rectifier 110 increases, a first current diversion circuit 330-1 turns on, providing a current path for a first LED set 120-1 such that the first LED set 120-1 illuminates. As the rectified voltage further increases, a second one of the LED sets 120-2 becomes forward biased and a second current diversion circuit 330-2 turns on, and the increased current through a resistor R0 turns off the first current diversion circuit 330-1. Additional LED sets may be turned on as the rectified voltage further increases and, after the rectified voltage peaks and starts described, the LED sets 120-1, 120-2, . . . , 120-N are sequentially turned off.

Figure 4:
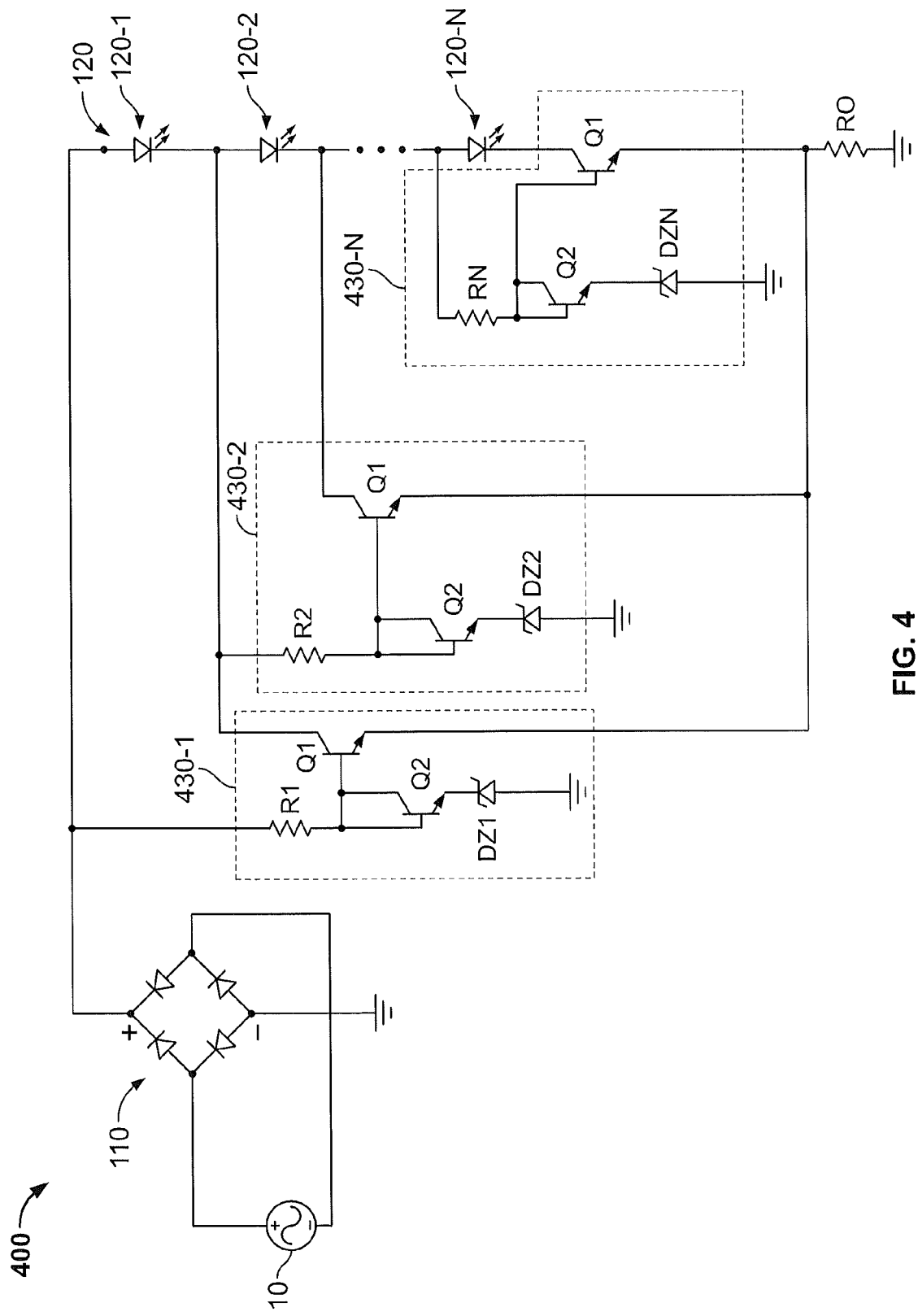

FIG. 4 illustrates a lighting apparatus 400 according to further embodiments which represents a modification of the current diversion circuitry of FIG. 1. In the apparatus 400, current diversion circuits 430-1, 430-2, . . . , 430-N include current path transistors Q1 and biasing transistors Q2 and resistors R1, R2, . . . , Rn as in the apparatus 100 of FIG. 1. In the current diversion circuits 430-1, 430-2, . . . , 430-N of FIG. 4, however, the base biasing diodes D are replaced by zener diodes DZ1, DZ2, . . . , DZN, which provide different base bias voltages for the current path transistors Q1 of the respective current diversion circuits 430-1, 430-2, . . . , 430-N. This circuitry operates in a manner similar to that of the current diversion circuitry of the apparatus 100 of FIG. 1.

Figure 5:
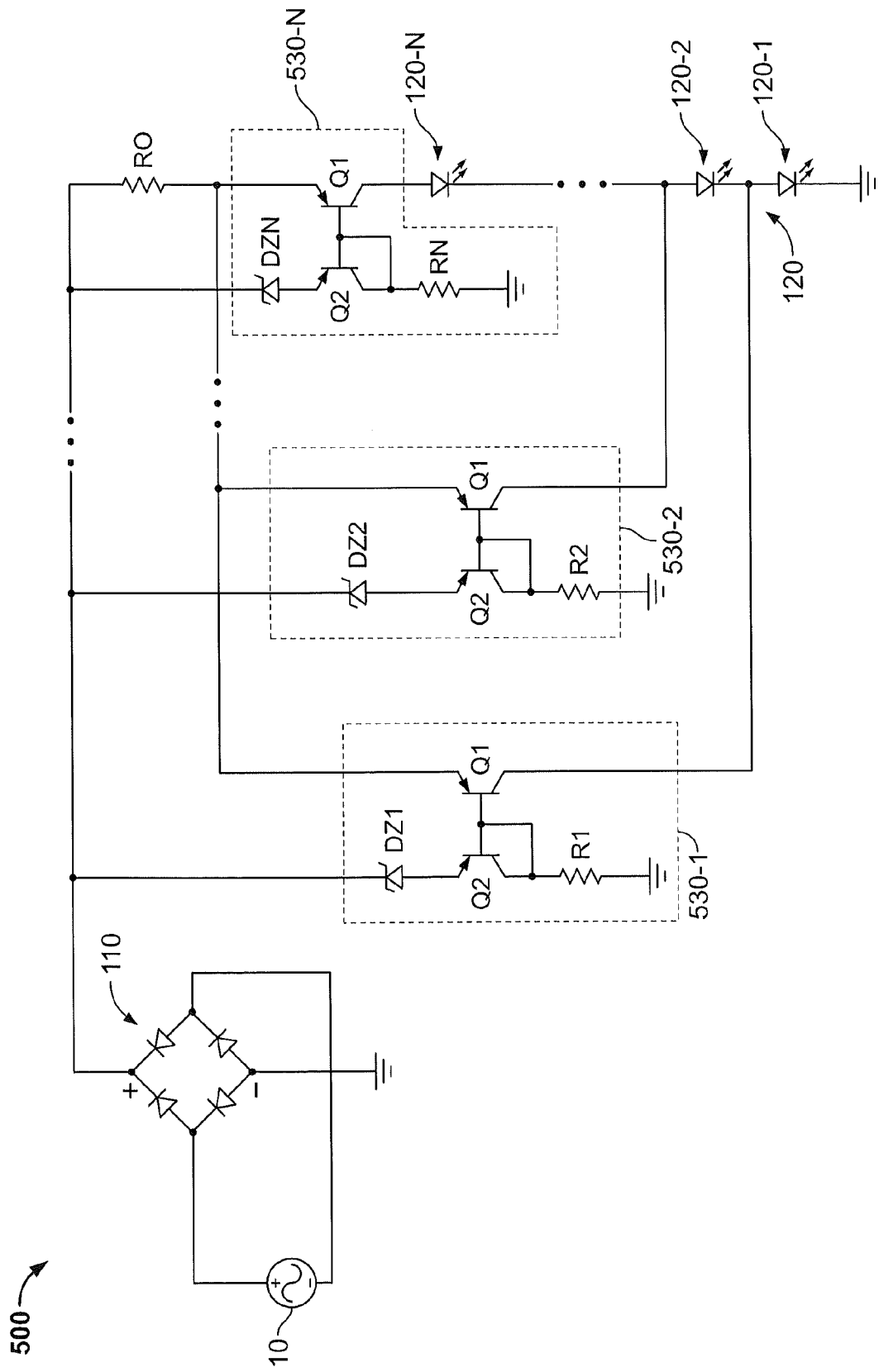

FIG. 5 illustrates a similar modification of the circuitry of the apparatus 300 of FIG. 3. In the apparatus 500 of FIG. 5, current diversion circuits 530-1, 530-2, . . . , 530-N include current path transistors Q1 and biasing transistors Q2 and resistors R1, R2, . . . , Rn as in the apparatus 300 of FIG. 3. In the current diversion circuits 530-1, 530-2, . . . , 530-N of FIG. 5, however, the base biasing diodes D are replaced by zener diodes DZ1, DZ2, . . . , DZN, which provide different base bias voltages for the current path transistors Q1 of the respective current diversion circuits 530-1, 530-2, . . . , 530-N.

Figure 6:
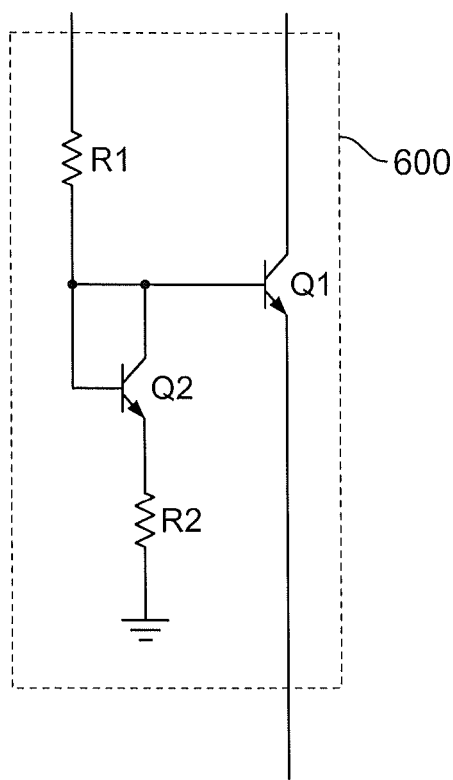
FIGS. 6 and 7 illustrate current diversion circuits according to further embodiments.
Figure 7:
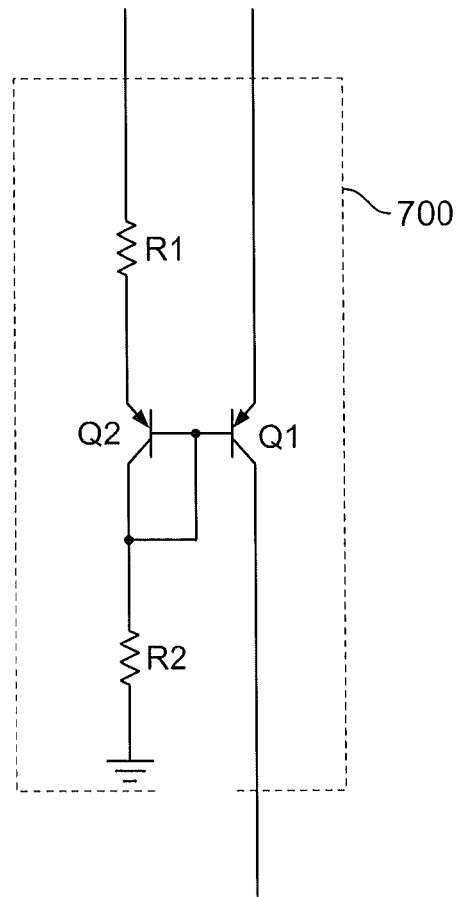

According to further embodiments, current diversion circuits may utilize resistor voltage dividers instead of diodes to bias current path transistors. For example, as shown in FIG. 6, a current diversion circuit 600 may include a current path transistor Q1, biased with a network including a diode-connected transistor Q2 and resistors R1, R2. In a lighting apparatus in which multiple ones of such current diversion circuits are used along the lines of the apparatus 100 and 400 of FIGS. 1 and 4, for example, the resistors R1, R2 are chosen to provide different base bias voltages for respective ones of the current diversion circuits. As shown in FIG. 7, a current diversion circuit 700 may be similarly used in place of the current diversion circuits of the apparatus 300, 500 of FIGS. 3 and 5.

Figure 8:
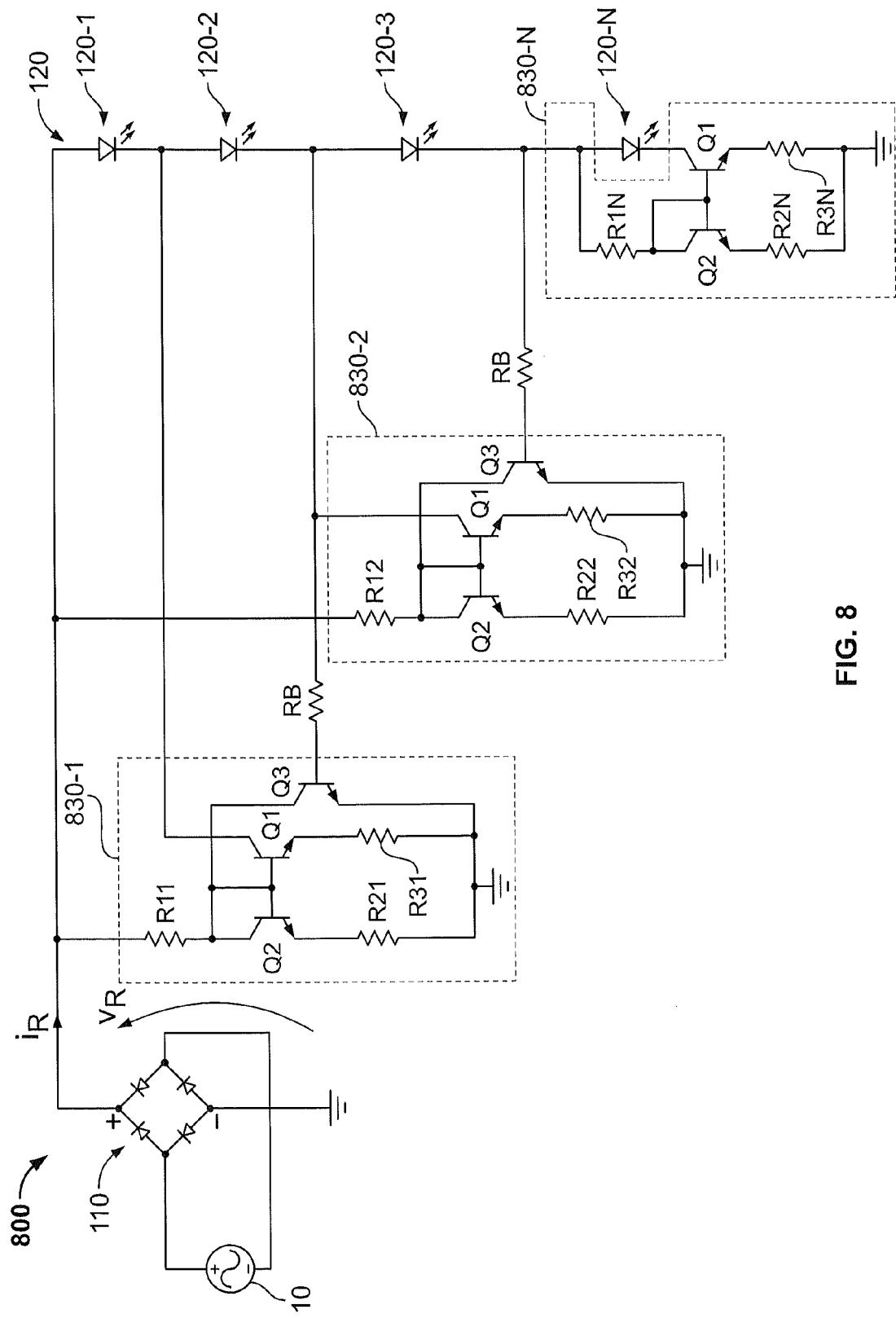
FIG. 8 illustrates a lighting apparatus according to further embodiments.

In further embodiments, current arising from a bias state transition of an LED set may be used to disable a current path transistor in a modification of the approach described above with reference to FIGS. 1-7. FIG. 8 illustrates a lighting apparatus 800 that includes a string 120 of serially connected LED sets 120-1, 120-2, . . . , 120-N. Each of the LED sets 120-1, 120-2, . . . , 120-N includes at least one LED, and may include various parallel and/or serial arrangements of LEDs. Power is provided to the LED string 120 from a rectifier circuit 110 that is configured to be coupled to an AC power source 10 and to produce a rectified voltage $v_R$ and current $i_R$ therefrom.

Respective current diversion circuits 830-1, 830-2, . . . , 830-N are connected to respective nodes of the string 120, and are configured to provide current paths that bypass respective groups of the LED sets 120-1, 120-2, . . . , 120-N. The current diversion circuits 830-1, 830-2, . . . , 830-N each include a transistor Q1 that is configured to provide a controlled current path that may be used to selectively bypass the LED sets 120-1, 120-2, . . . , 120-N. The transistors Q1 are biased using transistors Q2 and resistors R11, R12, . . . , R1N, R21, R22, . . . , R2N. The resistors R11, R12, . . . , R1N, R21, R22, . . . , R2N provide different base bias voltages for the current path transistors Q1. Resistors R31, R32, . . . , R3N serve as current limiters. The current diversion circuits 830-1, 830-2, . . . , 830-(N−1) further include turn-off transistors Q3, which are used to turn off the current path transistors Q1 responsive to base currents received from nodes of the string 120 via current limiting resistors RB. The last current diversion circuit 830-N does not include such a turn-off transistor.

The current diversion circuits 830-1, 830-2, . . . , 830-N are configured to operate in response to bias state transitions of the LED sets 120-1, 120-2, . . . , 120-N as the rectified voltage $v_R$ increases and decreases, such that the LED sets 120-1, 120-2, . . . , 120-N are incrementally activated and deactivated as the rectified voltage $v_R$ rises and falls. The transistors Q1 are turned on and off as bias states of the LED sets 120-1, 120-2, . . . , 120-N change.

Figure 9:
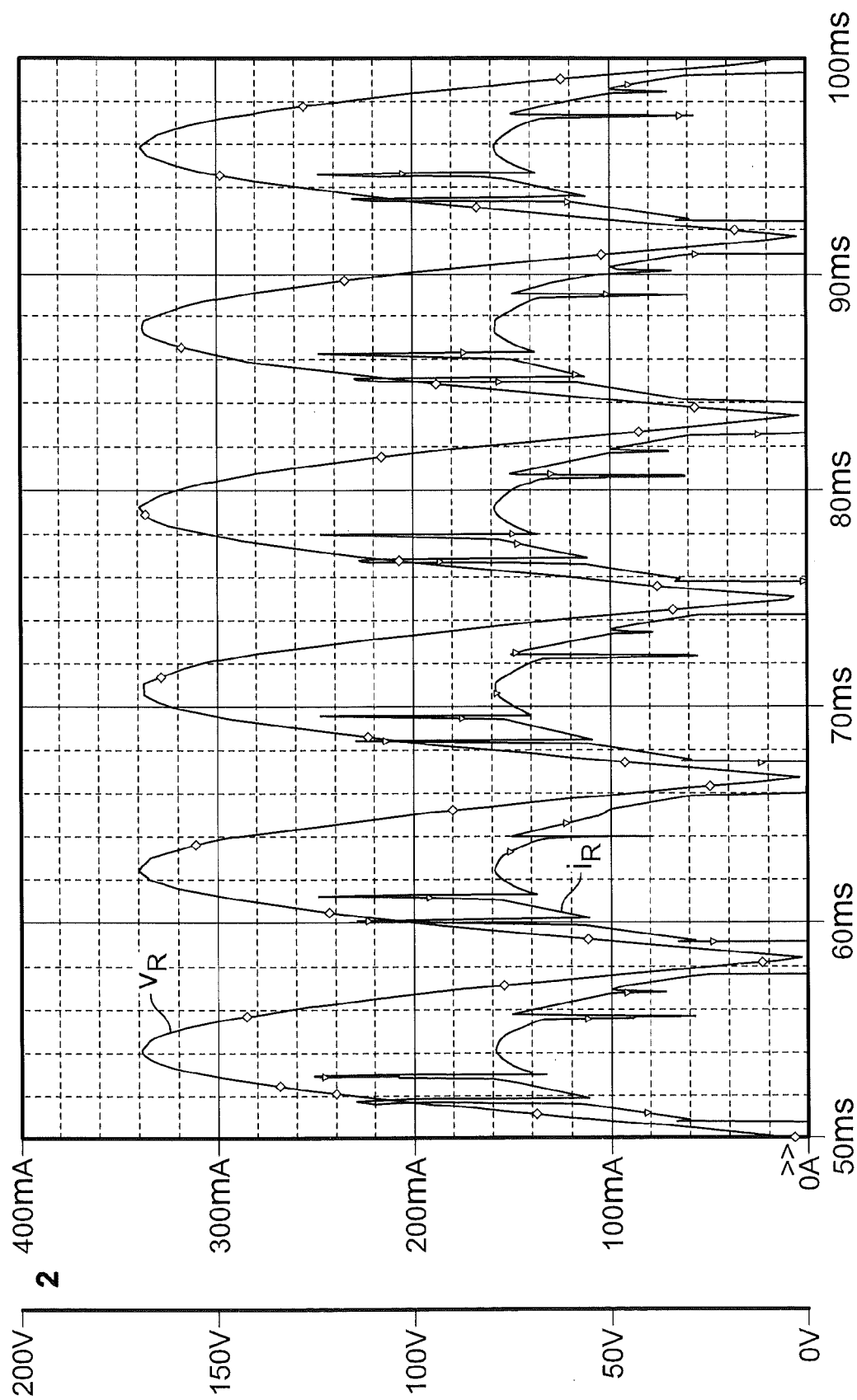
FIG. 9 illustrates current and voltage waveforms of the apparatus of FIG. 8.

FIG. 9 illustrates waveforms for the rectified voltage $v_R$ and current $i_R$ for the apparatus 800 of FIG. 8 for a three-stage (N=3) implementation. As the rectified voltage $v_R$ increases to a level sufficient to forward bias the first LED set 120-1, current begins to flow through the first LED set 120-1 and the current path transistor Q1 of the first current diversion circuit 830-1. When the rectified voltage $v_R$ further increases to a level sufficient to forward bias the second LED set 120-2, base current is provided to the turn-off transistor Q3 of the first current diversion circuit 830-1 via the second LED set 120-2, thus turning off the current path transistor Q1 of the first current diversion circuit 830-1. Thus, current flows through the first and second LED sets 120-1, 120-2 via the second current diversion circuit 830-2. When the rectified voltage $v_R$ further increases to a level sufficient to cause current to flow through the third LED set 120-3, a similar transition occurs, i.e., the current flow through the second current diversion circuit 830-2 is stopped by base current supplied to its turn-off transistor Q3 via the third LED set 120-3. A reversed series of transitions occurs after the rectified voltage $v_R$ peaks and then decreases.

Figure 10:
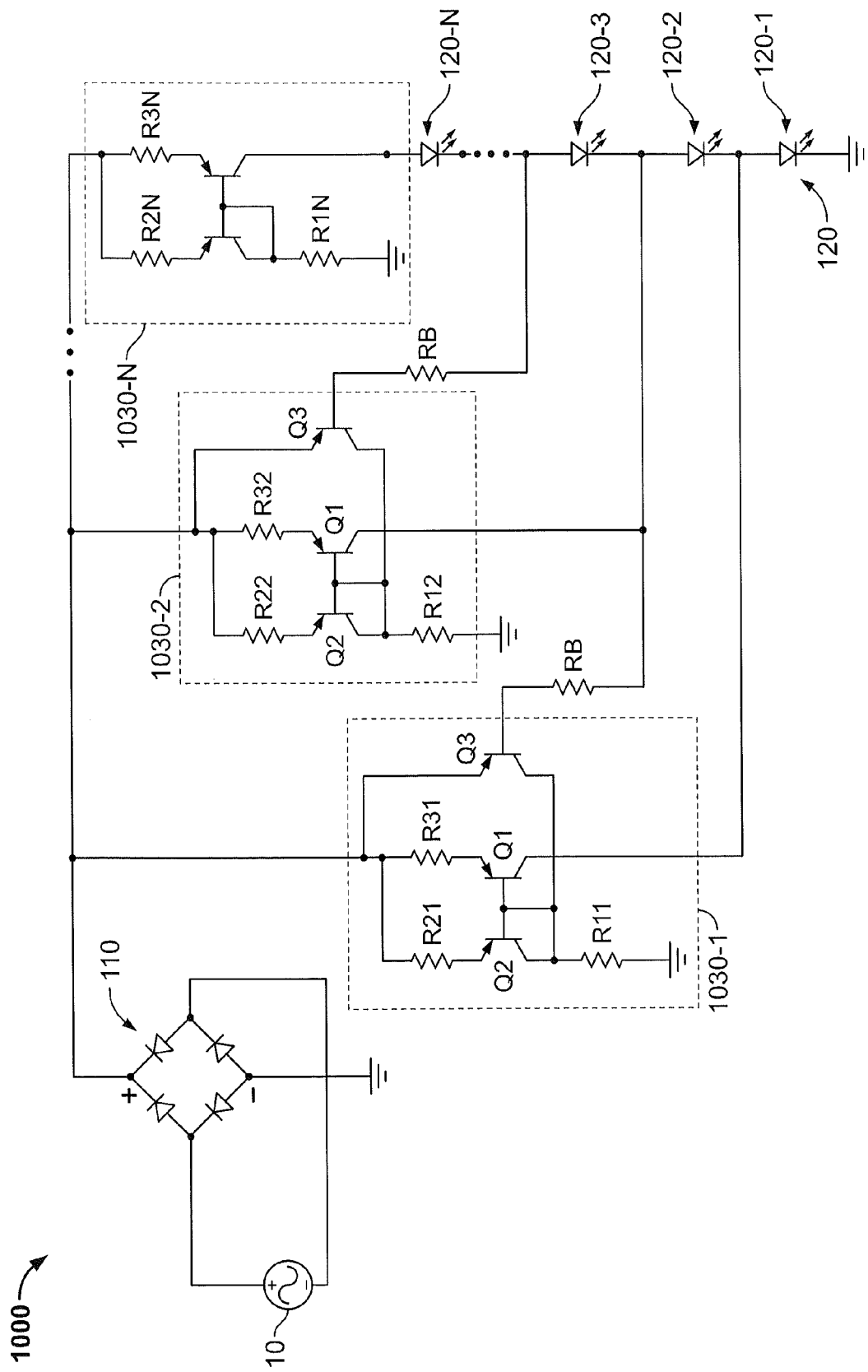
FIG. 10 illustrates a lighting apparatus according to still further embodiments.
Figure 11:
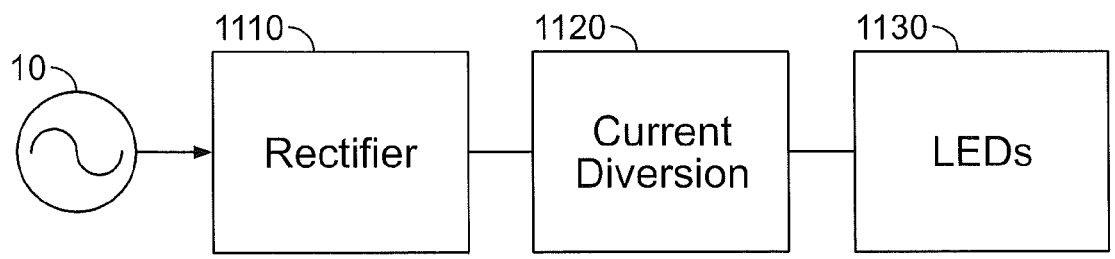
FIG. 11-13 illustrate various arrangements of lighting apparatus components according to some embodiments.

FIG. 10 illustrates a lighting apparatus 1000 that represents a dual of the circuit shown in FIG. 8. In the apparatus 1000, current diversion circuits 1030-1, 1030-2, . . . , 1030-N use PNP transistors Q1, Q2, Q3 instead of the NPN transistors shown in FIG. 8, connected in a manner that reflects the inverted polarity of these devices in relation to the corresponding NPN devices of FIG. 8.

Current control circuit as described herein may be implemented in a number of different ways. For example, a rectifier circuit, current diversion circuitry and LEDs as illustrated, for example, in the embodiments of FIGS. 1, 3-8 and 10, may be integrated in a common unit configured to be coupled to an AC power source. Such an integrated unit may take the form, for example, of a lighting fixture, a screw-in or plug in replacement for a conventional incandescent or compact fluorescent lamp, an integrated circuit or module configured to be used in a lighting fixture or lamp or a variety of other form factors. In some embodiments, portions of the current diversion circuitry may be integrated with the LEDs using composite semiconductor structures, e.g., the current diversion transistors Q1 illustrated in FIGS. 1, 3-9 and 10 may integrated with the respective LEDs that they control to provide multi-terminal controllable LED devices configured for use in arrangements along the lines illustrated in these figures.

Figure 12:
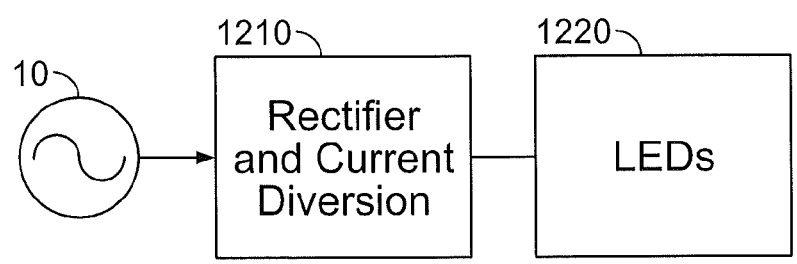
Figure 13:
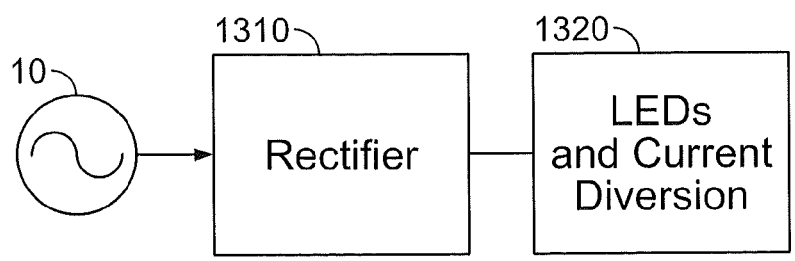

In some embodiments, such as shown in FIG. 10, a rectifier circuit, current diversion circuitry, and LEDs may be implemented as separate units 1110, 1120, 1130 configured to be connected to an AC power source 10 and interconnected, for example, by wiring, connectors and/or printed circuit conductors. In further embodiments, as shown in FIG. 12, rectifier and current diversion circuitry may be integrated in a common unit 1210, e.g., in a common microelectronic substrate, thick film assembly, circuit card, module or the like, configured to be connected to an AC power source 10 and to LEDs 1220. As shown in FIG. 13, LEDs and current diversion circuitry may be similarly integrated in a common unit 1320 that is configured to be coupled to a rectifier unit 1310.

In the drawings and specification, there have been disclosed typical embodiments of the inventive subject matter and, although specific terms are employed, they are used in a generic and descriptive sense only and not for purposes of limitation, the scope of the inventive subject matter being set forth in the following claims.

What is claimed is:

1. A lighting apparatus comprising:
a string of light emitting diode (LED) sets coupled in series, each set comprising at least one LED;
a resistor coupled in series with the string; and
a plurality of current diversion circuits, respective ones of which are coupled to respective nodes of the string and to a terminal of the resistor and configured to operate responsive to bias state transitions of respective ones of the LED sets, wherein a first one of current diversion circuits is configured to conduct current to a first one of the LED sets while bypassing a second one of the LED sets and to be turned off responsive to a voltage at the terminal of the resistor.

2. The apparatus of claim 1, wherein the first one of the current diversion circuits is configured to conduct current responsive to a forward biasing of the first one of the LED sets.

3. The apparatus of claim 1, wherein a second one of the current diversion circuits is configured to conduct current responsive to a forward biasing of the second one of the LED sets.

4. The apparatus of claim 1, wherein the first one of the current diversion circuits comprises a bipolar transistor providing a controllable current path between a node of the string and a terminal of a power supply, and wherein current through the resistor varies an emitter bias of the bipolar transistor.

5. The apparatus of claim 1, wherein the bias states of the LED sets transition responsive to a power supply having a varying voltage such that the diversion circuits are incrementally turned on and off in response to increases and decreases in the varying voltage.

6. A lighting apparatus comprising:
a string of light emitting diode (LED) sets coupled in series, each set comprising at least one LED; and
a plurality of current diversion circuits, respective ones of which are coupled to respective nodes of the string and configured to operate responsive to bias state transitions of respective ones of the LED sets, wherein a first one of current diversion circuits is configured to conduct current to a first one of the LED sets while bypassing a second one of the LED sets and to be turned off responsive to a current through the second one of the LED sets, wherein each of the current diversion circuits comprises:
a transistor providing a controllable current path between a node of the string and a terminal of a power supply; and
a turn-off circuit coupled to a node of the string and to a control terminal of the transistor and configured to control the current path responsive to a control input.

7. The apparatus of claim 6, wherein current through one of the LED sets provides the control input.

8. The apparatus of claim 6, wherein the transistor comprises a bipolar transistor and wherein the turn-off circuit is configured to vary a base current of the bipolar transistor responsive to the control input.

9. A lighting apparatus comprising:
a rectifier circuit configured to be coupled to an AC power source and to generate a rectified AC voltage;
a resistor having a first terminal coupled to a first output node of the rectifier circuit;
a string of serially-connected LED sets, the string having a first end coupled to a second terminal of the resistor and a second end coupled to a second output node of the rectifier circuit, each LED set comprising at least one LED; and
a plurality of current diversion circuits, respective ones of which provide respective separate current paths from respective nodes of the string to the second terminal of the resistor and are configured to be selectively enabled and disabled responsive to bias state transitions of the LED sets as a magnitude of the rectified AC voltage varies.

10. The apparatus of claim 9, wherein a first one of the current diversion circuits is configured to conduct current via a first one of the LED sets and is configured to be turned off responsive to current through a second one of the LED sets.

11. The apparatus of claim 10, wherein the first one of the current diversion circuits is configured to conduct current responsive to a forward biasing of the first one of the LED sets.

12. The apparatus of claim 10, wherein the second one of the current diversion circuit is configured to conduct current responsive to a forward biasing of the second one of the LED sets.

13. The apparatus of claim 9, wherein each of the current diversion circuits comprises a bipolar transistor providing a controllable current path between a node of the string and the second terminal of the resistor and wherein current through the resistor varies an emitter bias of the bipolar transistor.

14. A lighting apparatus comprising:
a string of serially-connected LED sets, each LED set comprising at least one LED;
a resistor coupled having a terminal coupled to an end of the string; and
a plurality of transistors, respective ones of which are configured to provide respective separate controllable current paths between respective nodes of the string and the terminal of the resistor; and
a control circuit configured to control the transistors responsive to a voltage at the terminal of the resistor.

15. The apparatus of claim 14, wherein a first one of the transistors is configured to conduct current via a first one of the LED sets and wherein the control circuit is configured to turn off the first one of the transistors responsive to current through a second one of the LED sets.

16. The apparatus of claim 15, wherein an emitter of the first one of the transistors is biased by the voltage at the terminal of the resistor.

17. The apparatus of claim 15, wherein the control circuit comprises a turn-off circuit coupled to a node of the string and to a control terminal of the first one of the transistors and configured to turn off the first one of the transistors responsive to a control input.

18. The apparatus of claim 17, wherein the current through the second one of the LED sets provides the control input.

19. An apparatus comprising:
a plurality of current diversion circuits, respective ones of which are configured to be coupled to respective nodes of a string of serially-connected LED sets and to a terminal of a resistor coupled in series with the string, the current diversion circuits further configured to operate responsive to bias state transitions of respective ones of the LED sets, wherein a first one of current diversion circuits is configured to conduct current to a first one of the LED sets while bypassing a second one of the LED sets and to be turned off responsive to a voltage at the terminal of the resistor.

20. The apparatus of claim 19, wherein the first one of the current diversion circuits is configured to conduct current responsive to a forward biasing of the first one of the LED sets.

21. The apparatus of claim 19, wherein the second one of the current diversion circuit is configured to conduct current responsive to a forward biasing of the second one of the LED sets.

22. The apparatus of claim 19, wherein each of the current diversion circuits comprises a bipolar transistor providing a controllable current path between a node of the string and the terminal of the resistor and wherein current through the resistor varies an emitter bias of the bipolar transistor.

23. The apparatus of claim 19, further comprising a rectifier circuit configured to be coupled to a power source and having an output configured to be coupled to the string of LED sets.

24. An apparatus comprising:
a plurality of current diversion circuits, respective ones of which are configured to be coupled to respective nodes of a string of serially-connected LED sets and to operate responsive to bias state transitions of respective ones of the LED sets, wherein a first one of current diversion circuits is configured to conduct current to a first one of the LED sets while bypassing a second one of the LED sets and to be turned off responsive to a current through the second one of the LED sets, wherein each of the current diversion circuits comprises:
a transistor configured to provide a controllable current path between a node of the string and a terminal of a power supply; and
a turn-off circuit coupled to a node of the string and to a control terminal of the transistor and configured to control the current path responsive to a control input.

25. The apparatus of claim 24, wherein current through one of the LED sets provides the control input.

26. A method of operating a string of light emitting diode (LED) sets coupled in series, each set comprising at least one LED, the method comprising:
conducting current from a first one of the LED sets while bypassing a second one of the LED sets using a first current diversion circuit coupled to a terminal of a resistor coupled in series with the string;
conducting current from a second one of the LED sets using a second current diversion circuit coupled to the terminal of the resistor; and
turning off the first current diversion responsive to a voltage at a terminal of the resistor.

27. The method of claim 26, wherein each of the first and second current diversion circuits comprises a bipolar transistor providing a controllable current path between a node of the string and a power supply and wherein turning off the first current diversion responsive to current through the second one of the LED sets comprises varying an emitter bias of the transistor of the first current diversion circuit.

* * * * *